FIG_2_

Sept. 3, 1935. L. W. HILLS ET AL 2,013,408
CAN CASING MACHINE
Filed Jan. 23, 1933 13 Sheets-Sheet 3

INVENTORS
Leslie W. Hills
Harold W. Clark
BY
White, Prost, Fehr & Lothrop
ATTORNEYS.

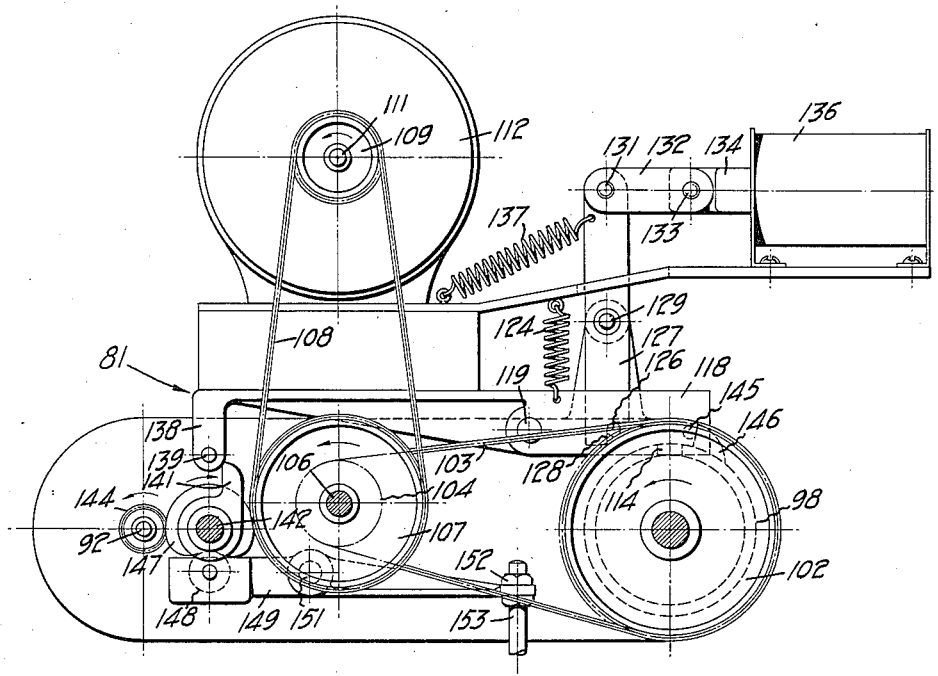
FIG_4_
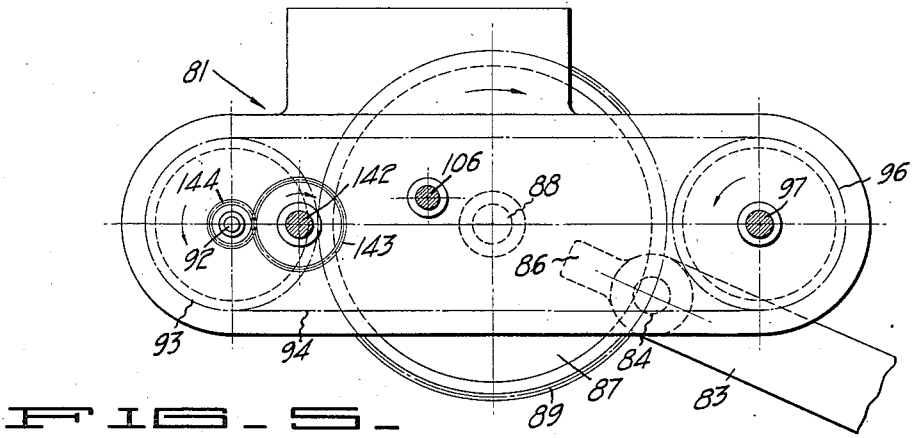
FIG_5_
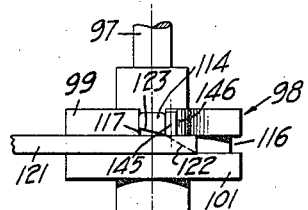
FIG_6_
INVENTORS
Leslie W. Hills
Harold W. Clark
BY
White, Prost, Fisher & Lothrop
ATTORNEYS.

Sept. 3, 1935.  L. W. HILLS ET AL  2,013,408
CAN CASING MACHINE
Filed Jan. 23, 1933  13 Sheets-Sheet 5
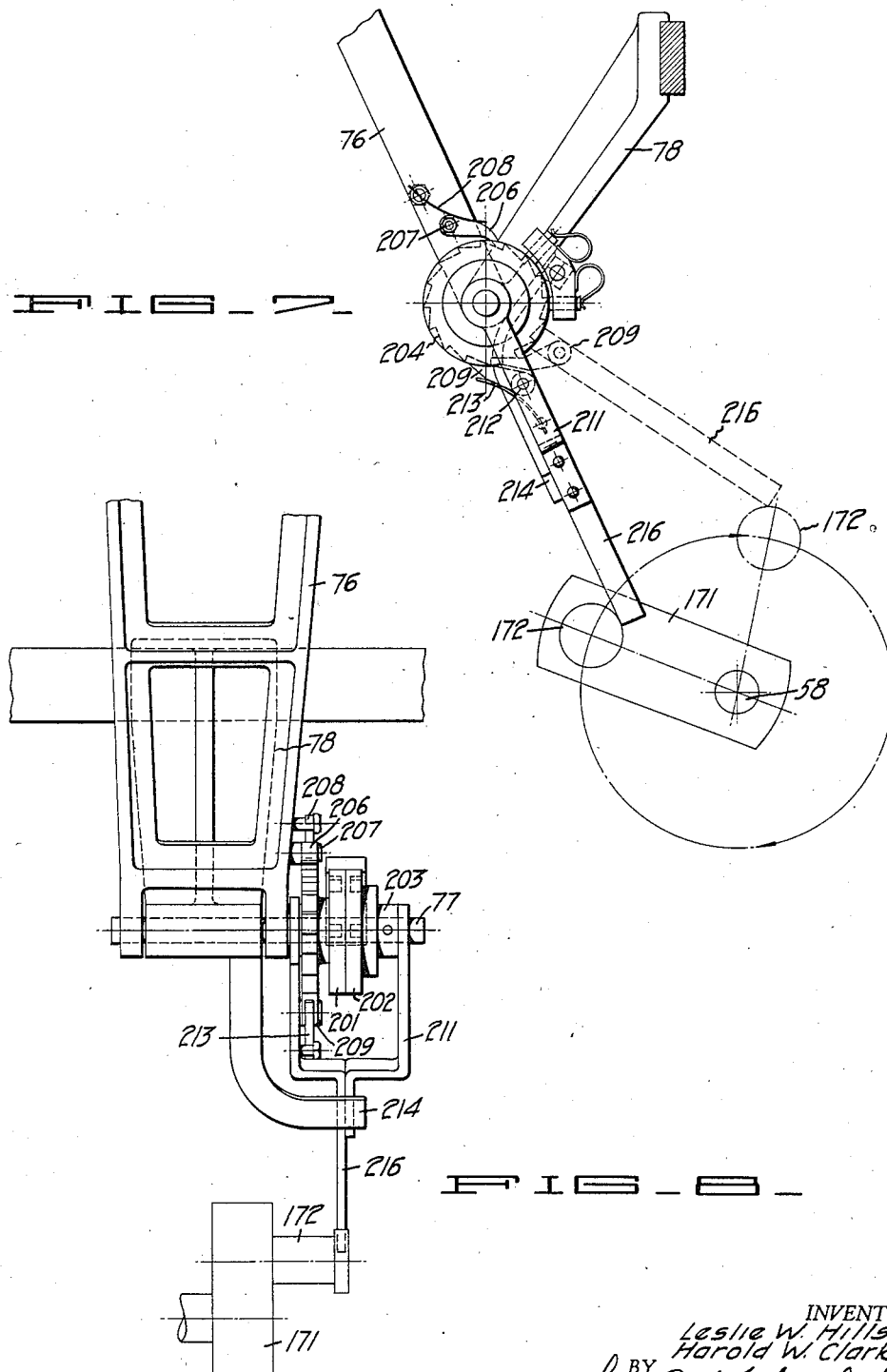
INVENTORS
Leslie W. Hills
Harold W. Clark
BY
White, Prost, Hehr & Lothrop
ATTORNEYS.

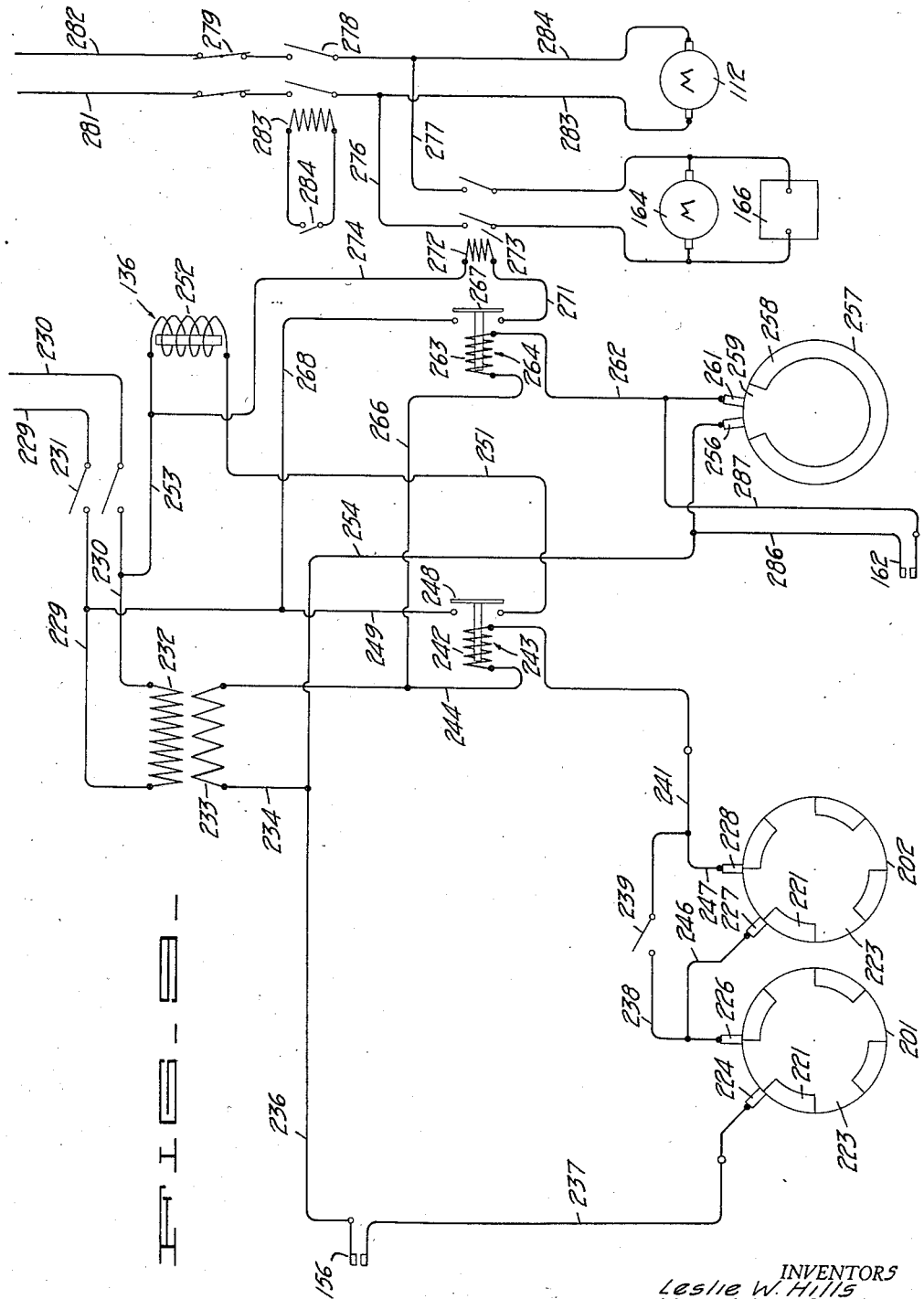

FIG_10_
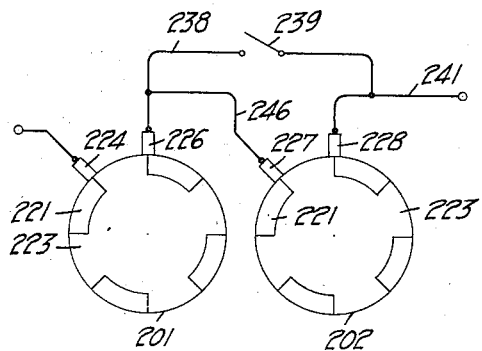
FIG_11_
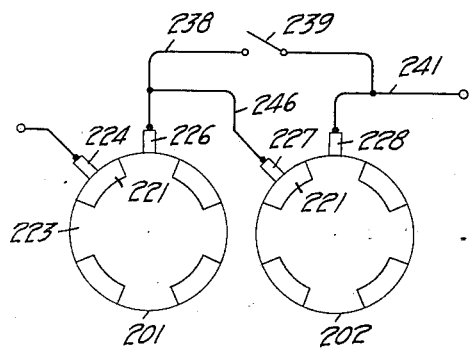
FIG_12_
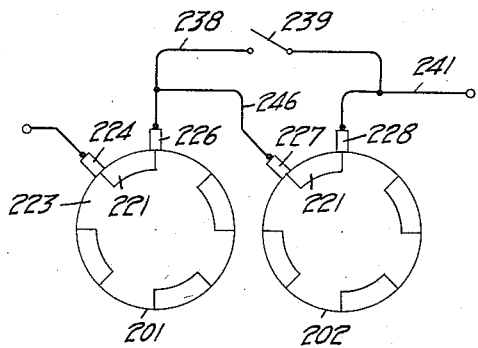
FIG_13_
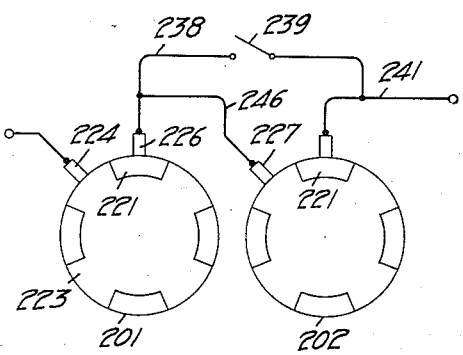

Sept. 3, 1935.  L. W. HILLS ET AL  2,013,408
CAN CASING MACHINE
Filed Jan. 23, 1933  13 Sheets-Sheet 8
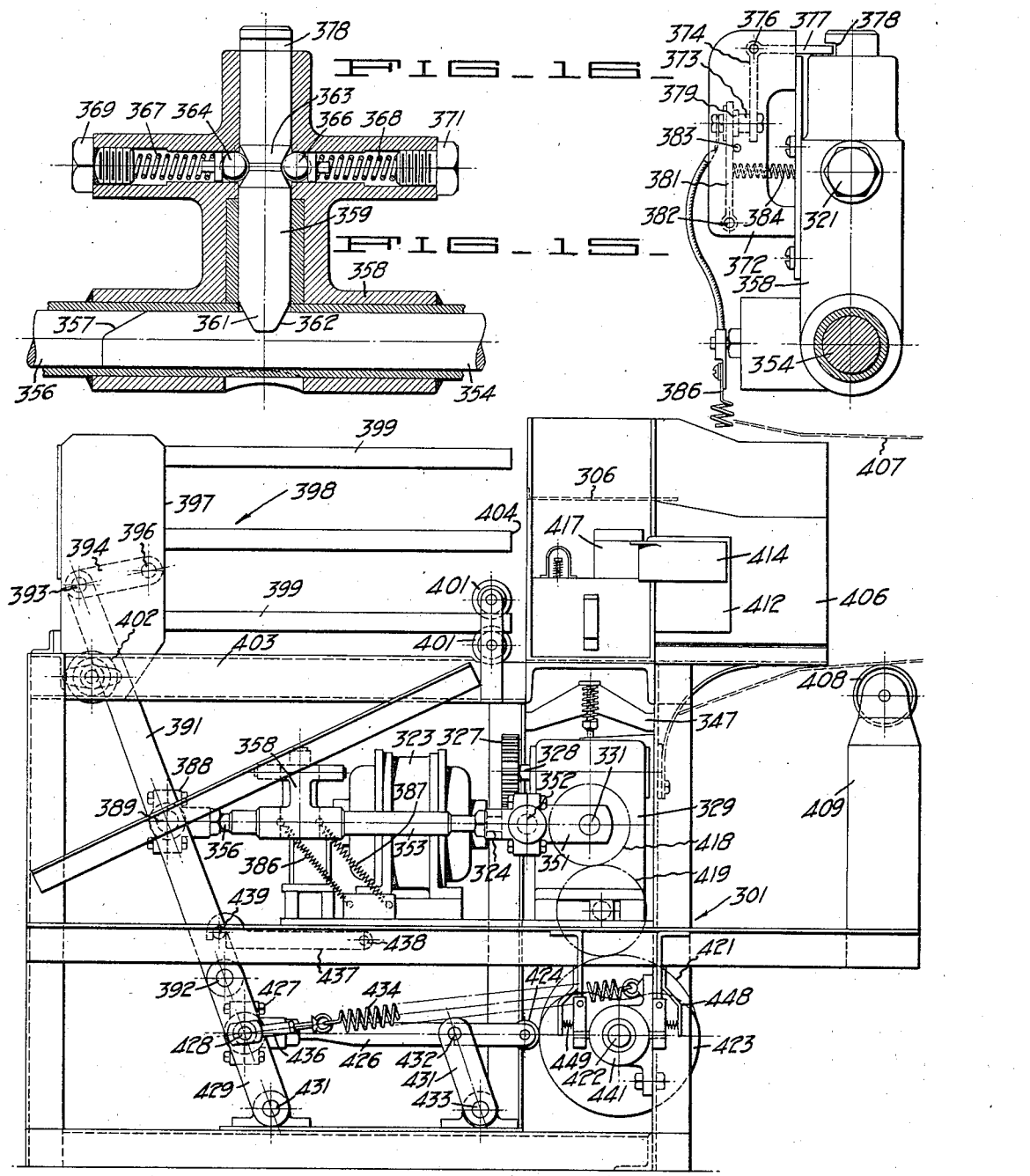
FIG_16_
FIG_15_
FIG_14_
INVENTORS
Leslie W. Hills
Harold W. Clark
BY
ATTORNEYS.

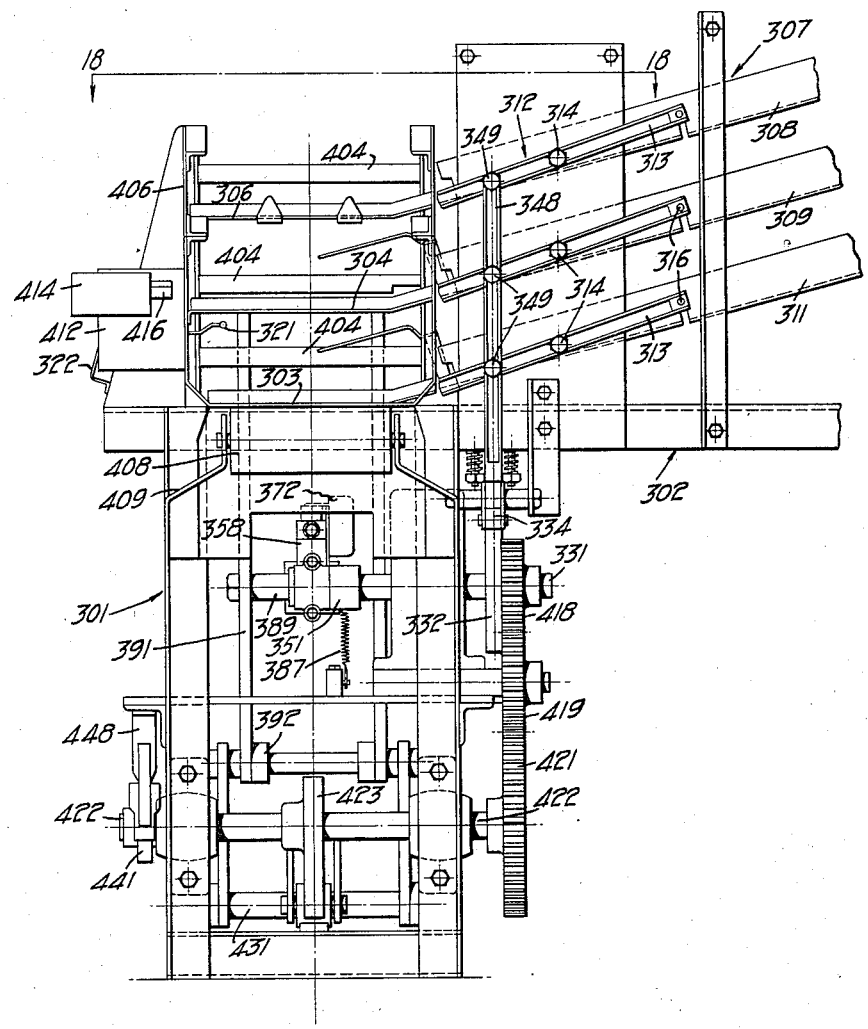

Sept. 3, 1935.  L. W. HILLS ET AL  2,013,408
CAN CASING MACHINE
Filed Jan. 23, 1933  13 Sheets-Sheet 10
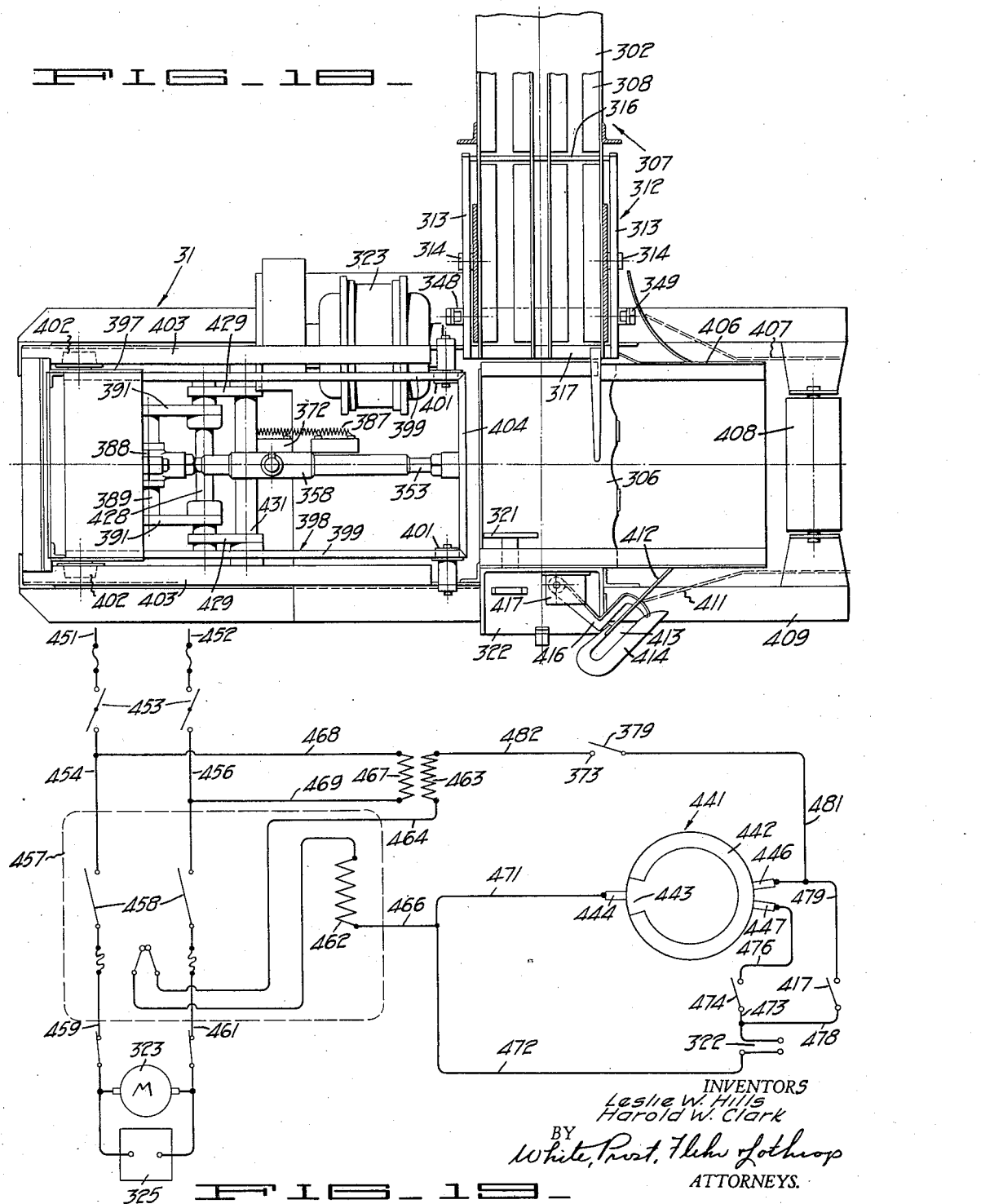

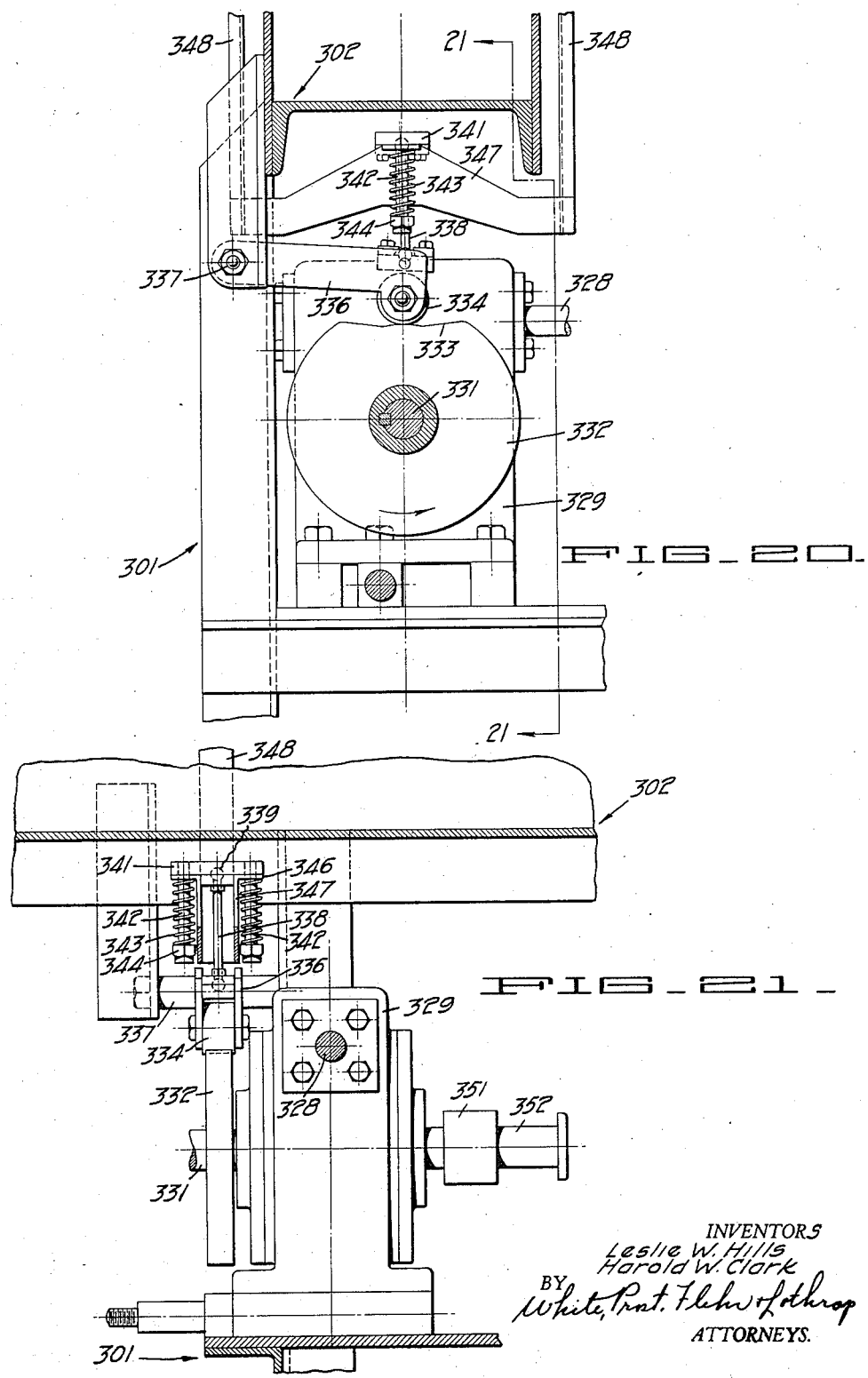

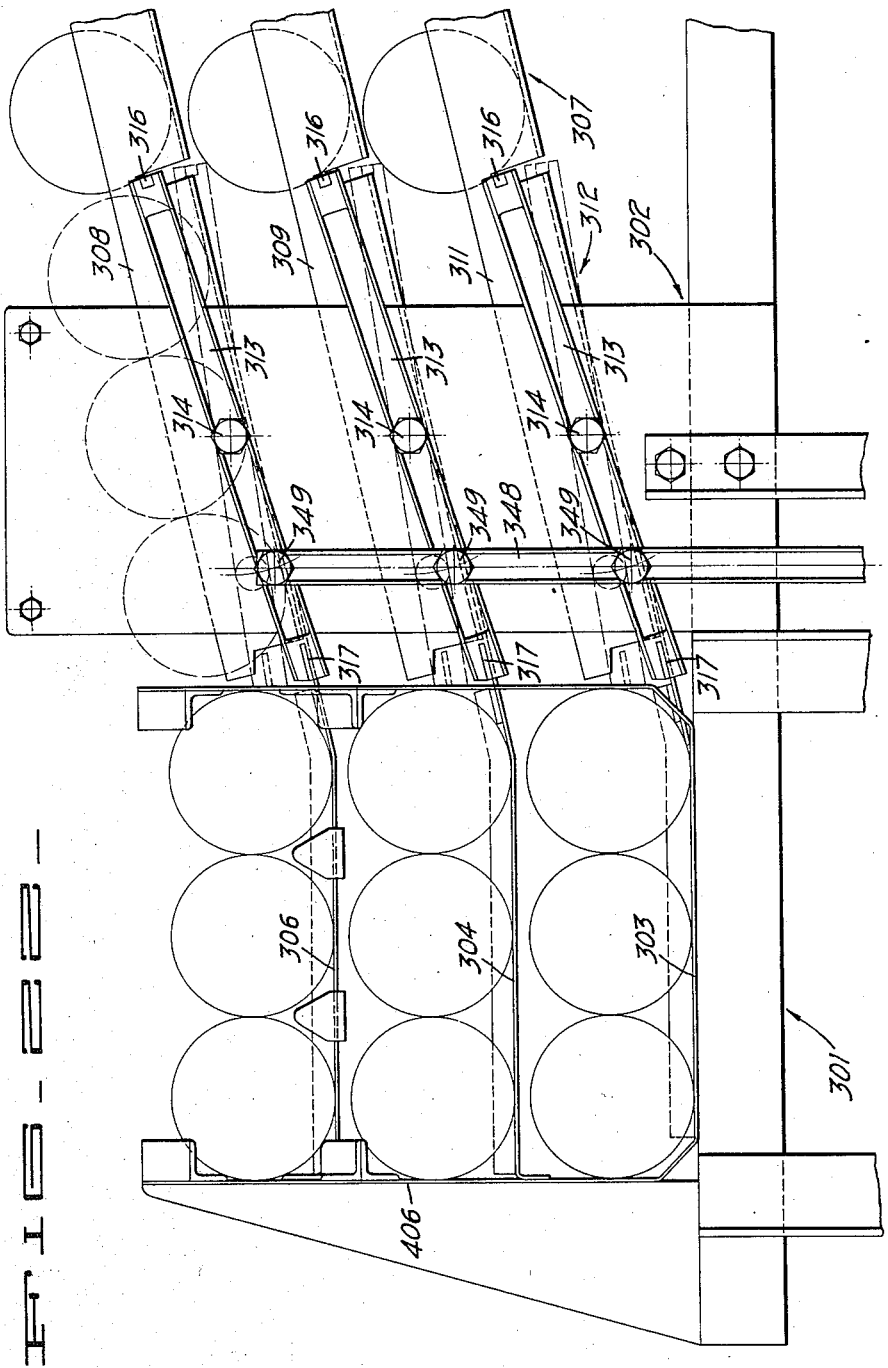

Sept. 3, 1935. L. W. HILLS ET AL 2,013,408
CAN CASING MACHINE
Filed Jan. 23, 1933 13 Sheets-Sheet 13
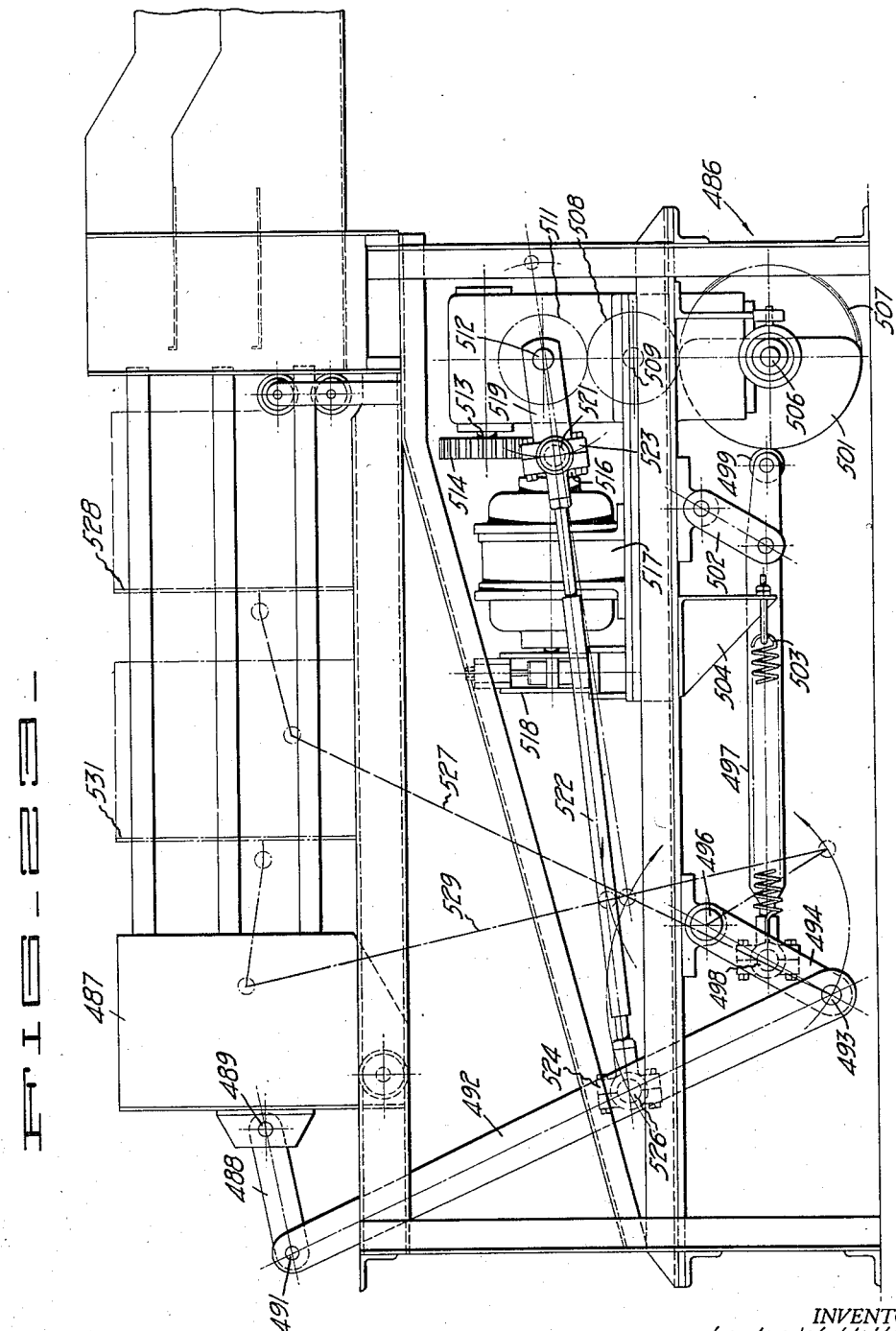
INVENTORS
Leslie W. Hills
Harold W. Clark
BY
White, Prost, Flehr & Lothrop
ATTORNEYS.

Patented Sept. 3, 1935

2,013,408

UNITED STATES PATENT OFFICE 2,013,408

CAN CASING MACHINE

Leslie W. Hills, San Francisco, and Harold W. Clark, Berkeley, Calif., assignors to Hills Bros., a corporation of California Application January 23, 1933, Serial No. 653,012

8 Claims. (Cl. 226—15)

Our invention relates to means for automatically placing a plurality of packages, such as cans, in a predetermined arrangement, into a container such as a case or carton.

An object of our invention is to provide means for automatically placing a plurality of cans in a case or carton.

Another object of our invention is to provide means for automatically juxtaposing tiers or layers of cans and for automatically placing juxtaposed tiers or layers of cans in a case or carton.

Another object of our invention is to provide means for arranging a plurality of cans in a predetermined order to form a charge and for ejecting the charge of cans from the machine into a suitable case, leaving completely empty that portion of the machine where the charge of cans was formed.

A further object of my invention is to provide a can casing machine which is actuated upon the positioning of a case or carton in the machine to initiate the cycle of the machine during which the cans are arranged in order and are ejected from the machine into the carton or case.

Further objects and characteristics of the invention will appear from the following description in which the preferred embodiment of the invention has been set forth in detail in conjunction with the accompanying drawings.

In the drawings:

Figure 4 is a side elevation of the short stroke driving mechanism of the machine of Figure 1.

Figure 5 is a detail of a portion of the mechanism of Figure 4.

Figure 6 is a detail in plan of a clutch mechanism incorporated in the structure of Figure 4.

Figure 7 is a side elevation to an enlarged scale of the timing commutators shown in Figure 1.

Figure 8 is an end elevation of the mechanism shown in Figure 7.

Figure 9 is a wiring diagram for the electrical circuit of the machine shown in the preceding figure.

Figure 10 is a diagram of the timing commutators in their initial position.

Figure 11 is a view of the timing commutators in a position one step in advance of the position shown in Figure 10.

Figure 12 is a diagram of the timing commutators one step in advance of the position shown in Figure 11.

Figure 13 is a diagram of the timing commutators one step in advance of the position shown in Figure 12.

Figure 14 is a side elevation of a modified form of the can casing machine of our invention.

Figure 15 is a cross-section to an enlarged scale of the overlaid release mechanism shown in Figure 14.

Figure 16 is a side elevation of the release mechanism shown in Figure 15.

Figure 17 is a front elevation of the form of machine shown in Figure 14.

Figure 18 is a cross-section the plane of which is indicated by the line 18—18 of Figure 17 and disclosing the major portion of this machine in plan.

Figure 19 is a wiring diagram showing the circuit for the machine of Figure 14.

Figure 20 is a side elevation, partially in section, of the gate actuating mechanism of the machine in Figure 14.

Figure 21 is a cross-section the plane of which is indicated by the lines 21—21 of Figure 20.

Figure 22 is a side elevation of the gate mechanism of the machine of Figure 14.

Figure 23 is a side elevation of a machine in most respects similar to the machine of Figure 14 but showing a modified form of long and short stroke mechanism.

Figure 1:
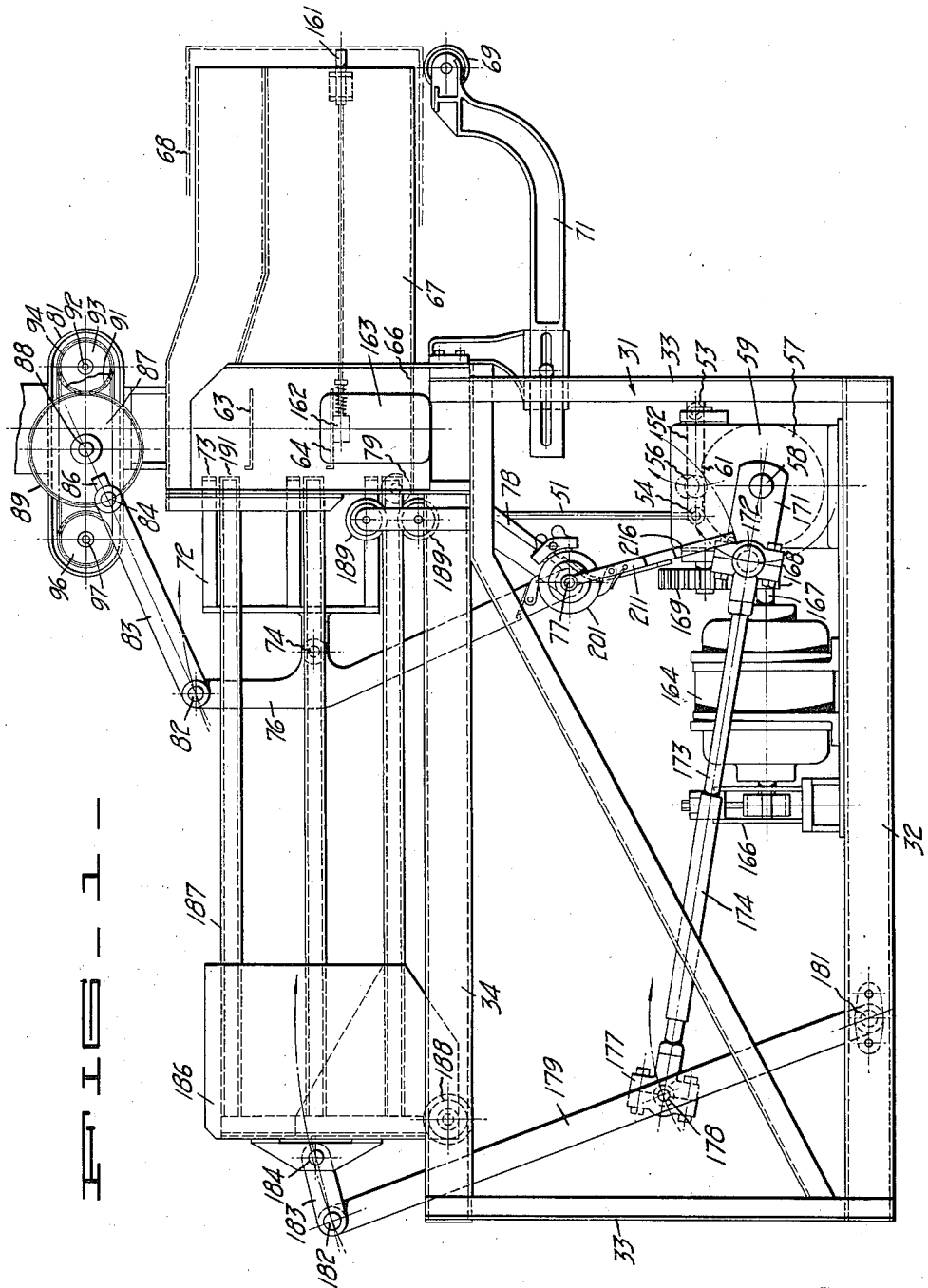
Figure 1 is a side elevation of one form of casing machine constructed in accordance with our invention.
Figure 2:
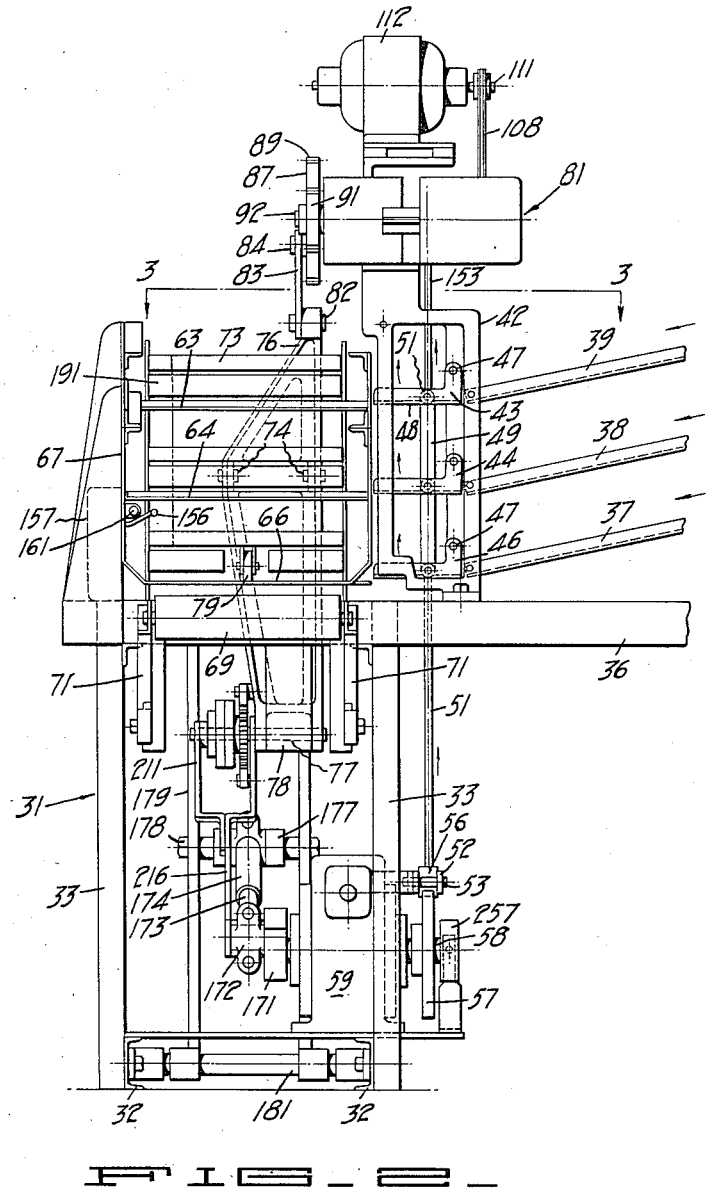
Figure 2 is a front elevation of the casing machine of Figure 1.
Figure 3:
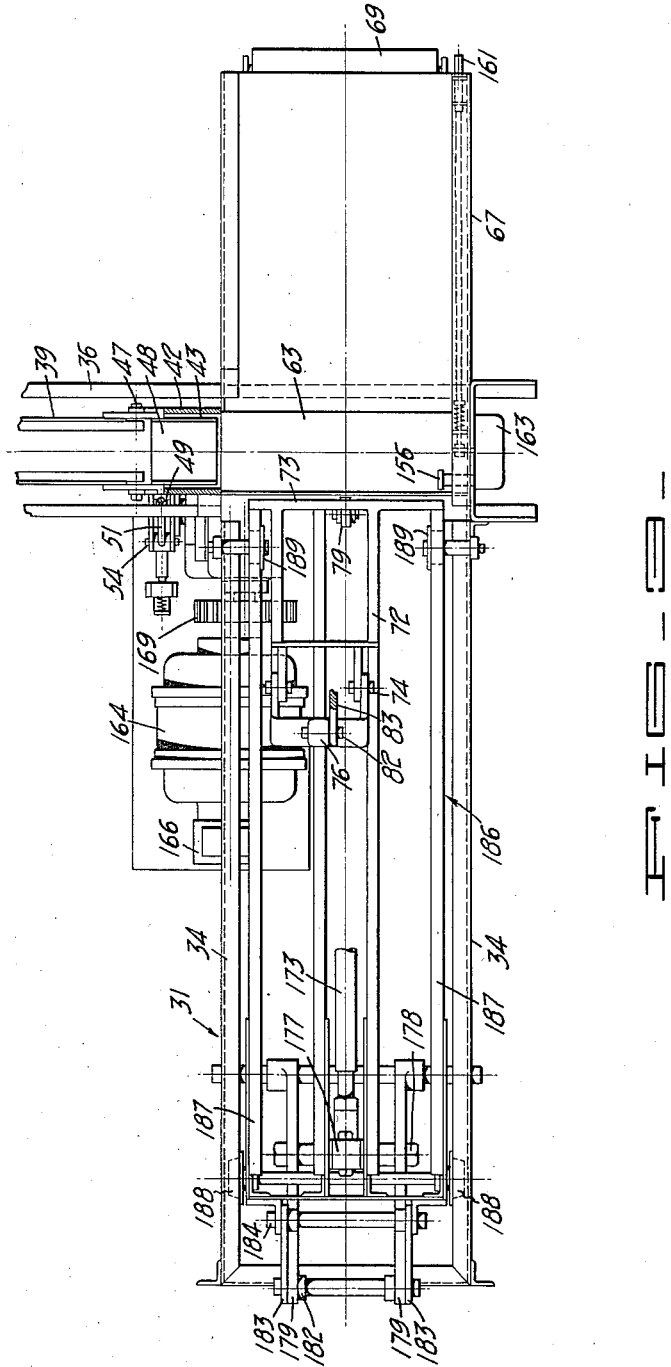
Figure 3 is a cross-section the plane of which is indicated by the line 3—3 of Figure 2.

In its preferred form, the can casing machine of our invention comprises a means for stacking cans in a plurality of juxtaposed rows, together with means for shifting the cans in the direction of their axes and a means for operating the shifting means once, or, alternatively, a plurality of times and then to a different extent each time, during the cycle of operation of the machine in order to eject the cans from the machine into a case and dispose the cans in a plurality of tiers in the case.

In the form of the device disclosed in Figures 1 to 13 inclusive, there is disclosed a machine having a framework generally indicated 31, made up of a plurality of structural members such as channels and angles. Preferably, the framework is made up of a pair of base channels 32 and a plurality of uprights such as 33. Spanning the uprights are longitudinal members 34. Extending laterally from the framework are additional supporting members 36 above which are located a plurality of runways 37, 38 and 39 respectively, which are inclined and on which a plurality of cans rolls gravitationally downward toward the framework of the machine. The downward progress of the cans is arrested adjacent a gate frame 42 by means of a plurality of gates 43, 44 and 46 which in general are identical and are adapted for simultaneous operation. Each of the gates is pivoted as at 47 to the gate frame 42 and includes a transverse platform 48 which in moving into one position is so disposed as to cause a retrograde or backward movement of the cans. The gate platform in another extreme position is adapted to aline with its associated runway, such as 39, in order to permit continued progress of the cans.

In order suitably to actuate the gates 43, 44 and 46 simultaneously, I preferably join them by a common strip 49 which is pivoted to the respective gates as at 51. The lowermost gate 46 is preferably joined by a rod 51 pivoted at opposite ends to a cam arm 52. The cam arm 52 at one extremity is pivoted as at 53 to the framework 31 and at its opposite extremity is joined by a pivot 54 to the rod 51. Between its ends the arm 52 carries a cam follower, such as a roller 56, adapted to co-operate with a cam disc 57 mounted on a cross shaft 58 extending from a speed reducer 59 mounted on the frame-work 31. The cam 57 is generally circular in external contour, but at one region on its periphery is provided with a depression 61 which permits the roller 56 to drop and the arm 52 to oscillate about its pivot 53, pulling the rod 51 with it.

The descent of the rod 51 is effective through the common strip 49 to pivot each of the gates 43, 44 and 46 about its respective pivot point 47 and to lower the gates so as to provide a continuous runway in alinement with the ways 37, 38 and 39. When, however, the disc 57 has rotated so that the depression 61 is not in registry with the roller 56, the roller is lifted, thereby lifting the arm 52 and the rod 51 and raising the gate platforms 48 into the position shown in Figure 2 in which forward movement of the cans is prevented and a small backward movement is imparted. In alinement with the platforms 48 when they are in their lowermost position, are shelves 63, 64 and 66 respectively, adapted to receive a plurality of cans.

In the operation of the machine, either the lowermost shelves 64 and 66 can be utilized, or all three of the shelves 63, 64 and 66 can be utilized, depending upon whether two rows or three superposed rows of cans are to be handled. The shelves 63, 64 and 66 respectively are preferably arranged in the machine in association with a cylinder 67 generally of approximately rectangular configuration, which extends from the machine and is of such size as to receive thereover a carton or case 68. A roller 69 on arms 71 affords an auxiliary support for the carton or case 68. Usually, the carton 68 is of such a depth as to receive more than a single tier of cans, and for that purpose we provide a mechanism for arranging the cans in the machine in a plurality of tiers. To this end there is provided a short stroke ram or plunger 72 which is in effect a skeleton frame having pusher bars 73 at its forward end and having a pivoted connection 74 at its rearward end to a pivoted arm 76 mounted as at 77 on a cross shaft carried by a bracket 78 depending from the framework 31. The lower, forward portion of the ram 72 carries a suitable roller 79 which runs on the lowermost shelf 66, so that when the arm 76 is oscillated about its pivot 77 the short stroke mechanism 72 is oscillated or reciprocated from its rearmost position, as shown in Figure 1, forwardly therefrom, carrying cans ahead of it and advancing the cans in an axial direction from a rearward position on the shelves 63, 64 and 66 to a forward position just ahead of the shelves with the upper layers resting on the lower layer.

In order to drive the short stroke mechanism 76 there is provided a driving assembly, generally designated 81, which is effective when energized to operate for one complete cycle at a time. The arm 76 is pivoted as at 82 to a link 83 which at its other end is pivoted as at 84 to a crank 86 on a crank disc 87. The disc 87 is rotatably mounted by means of a shaft 88 and around its periphery is provided with gear teeth 89. In mesh with the gear 89 is a pinion 91 on a shaft 92 which also carries a sprocket 93 engaged by a chain 94 extending to a similar sprocket 96. A shaft 97 carries the sprocket 96 and likewise carries a clutch mechanism 98 having one member 99 connected to the shaft 97 and another member 101 carrying a sprocket 102 which is joined by a chain 103 to a sprocket 104 on a shaft 106. Likewise carried by the shaft 106 is a sprocket 107 engaged by a chain 108 extending to a sprocket 109 on a shaft 111 of a driving motor 112.

The clutch mechanism 98 preferably includes a movable arm 114 adjacent a groove 116 between the members 99 and 101 and arranged so that the arm 114 can move axially between a position projecting into the groove 116 and a second position as shown in Figure 6 in an axial slot 117 in the member 99. When the parts are in the position shown in Figure 6, with the arm 114 in the recess 117, the members 99 and 101 are declutched and no power is transmitted from the motor 112 to the crank disc 87, but when the member 114 projects into the groove 116 the members 99 and 101 are clutched together and the crank disc 87 is driven by the motor 112.

In order effectively to accomplish the clutching and declutching action desired for a single cycle of movement, we preferably provide a rocking lever 118 which is pivoted as at 119 and has a relatively flat extension 121 adapted to be received in the groove 116. When the portion 121 is seated in the groove 116, the member 114 is kept out of the groove 116, and during the relative movement of these devices a beveled face 122 on the member 121 co-operates with a beveled face 123 on the member 114, so that as these members meet and pass each other the member 114 is moved from any position in the groove 116 axially until it resides in the recess 117. Normally, the rocking lever or arm 118 is urged in such a direction by a coil spring 124 that the portion 121 tends to move out of the groove 116, but such movement cannot be effected until a latch mechanism is released. The member 121 carries a pin 126 adapted to interengage with a latch lever 127 having a suitable notch 128 in its lowermost extremity and which is adapted to pivot about the shaft 129. The latch lever 127 at its upper end is pivoted as at 131 to a link 132 in turn pivoted as at 133 to the core 134 of a solenoid generally designated 136. A spring 137 normally retracts the core 134 from the solenoid 136 and maintains the latch lever 127 in engagement with the pin 126 so that the spring 124 is ineffective to lift a portion 121 out of the groove 116. Upon energization of the solenoid 136, however, the core 132 is drawn thereinto and oscillates the latching lever 127, thereby releasing the pin 126 and permitting the spring 124 to lift the portion 121 of the clutching lever.

In addition to the foregoing mechanism effective upon the clutch lever 118, we preferably terminate the lever at one end in a depending ear 138 which carries a cam follower in the form of a roller 139 adapted to co-operate with a cam 141 mounted to rotate in conjunction with a cross shaft 142. The shaft 142 carries a gear 143 which meshes with a pinion 144 mounted on the shaft 92. The configuration of the cam 141 is such that it periodically engages the roller 139 and lifts the roller so that the lever 118 is oscillated about its pivot point 119 and the portion 121 of the lever is forcibly depressed into the groove 116, thereby causing an interengagement of the inclined pivot 122 with the inclined base 123 and insuring a positive declutching of the portions 99 and 101 of the clutch. In addition simply to insure a declutching action, the mechanism is positively stopped by means of a pin 145 carried by the portion 121 and abutted by a projection 146 extending upwardly from the clutch member 98, so that when the short stroke driving mechanism has completed a cycle the parts are declutched from the driving motor 112 and are brought to a positive stop in full cycle position. In addition to the cam 141 on the shaft 142, we preferably provide an additional cam 147 which is designed to engage a cam follower in the form of a roller 148 carried at one extremity of a lever 149 pivoted as at 151. The opposite extremity of the lever 149 is connected as at 152 to a rod 153, at its lower end pivoted to the common gate operating member 49.

In the operation of the short stroke mechanism the leading can on the lower shelf 66, which has rolled into position from the runway 37 in conjunction with other cans in the superposed shelves 64 and 63, contacts a switch arm 156 when the can has arrived in its predetermined position on the shelf 66, and through a switch mechanism 157 closes the circuit of the solenoid 136. Such action releases the latch lever 127 and when, during the rotation of the shaft 142, the cam 141 releases the roller 139, the spring 124 oscillates the lever 118 so as to permit a clutching action between the members 99 and 101, and, through the connecting motion transmitting mechanism, causes rotation of the crank disc 87. Through the link 83 the arm 76 is thereby oscillated, causing a comparable reciprocation of the member 72. The translation of the member 72 is of sufficient extent to move the cans axially forward and to permit the cans to rest stationary just forward of the shelves 63, 64 and 66. The ram 72 then reciprocates in the opposite direction and is returned to the position shown in Figure 1, with the way clear between the rows of cans just advanced and the contacting bar 73 for a successive row of cans. When the short stroke mechanism returns to its full cycle position the cam 141 contacts the roller 139 and causes the portion 121 to enter the groove 116, thereby effecting a declutching of the members 99 and 101, and, since the foremost can on the shelf 66 has been advanced away from the switch arm 156, the circuit to the solenoid 136 is open and the latch lever 127 springs into place under the urgency of the spring 137 and latches the clutch actuating portion 121 in declutching position.

When the gates 43, 44 and 46 are lowered, therefore, and permit cans from the runway 37 to advance thereover into contact with the switch arm 156, the short stroke mechanism is put into operation for a single cycle and advances the cans forwardly in an axial direction on the shelves 63, 64 and 66, and as the short stroke mechanism approaches its full cycle position, not only is the motor power declutched and the short stroke mechanism returned to rest in the position shown in Figure 1, but the cam 147 at the initiation of the operation of the short stroke mechanism has actuated the lever 149 to lift the rod 153 which similarly raises the gate operating member 49 so as to force backward succeeding cans on the runways 37, 38 and 39. At the close of the single cycle of operation of the short stroke mechanism, however, the cam 147 is again in such a position that the lever 149 is effective to lower the rod 153 and to lower the gate platform 48 so that successive cans on the runways 37, 38 and 39 are permitted gravitally to roll across the gate platforms 48 in file and in superposed rows behind the cans just displaced by the short stroke mechanism and to arrange themselves on the shelves 63, 64 and 66 in axial alinement with the cans previously in the machine, to form a second tier. Depending upon the adjustment of the machine, the second tier so formed can be advanced by the short stroke mechanism by precisely the cycle of operation just described and will advance the initial tier still farther forward and make way for still a third tier. Usually, however, with one particular adjustment of the machine it is desirable to arrange four tiers of cans for ejection from the machine into the case 68. In this event we prefer that the short stroke mechanism, after having completed three cycles, remain inactive for the time being and that the fourth tier of cans, although in contact with the switch arm 56, be ineffective upon the clutching solenoid 136 for the short stroke mechanism, and that a long stroke mechanism come into operation in order to eject simultaneously, into the case 68, the four tiers of cans so arranged.

To this end we provide on the cylindrical extension 67 a forwardly projecting rod 161 which is adapted to be contacted by the bottom of a case placed over the extension 67 and which is adapted to be axially translated upon the case being shoved home. The rod 161 is effective upon a switch 162 in a switch box 163 to close a circuit to the main driving motor 164 of the long stroke mechanism, which motor is mounted on the framework 31. Preferably, the motor 164 is electric and is provided with a magnetic brake 166 so that the motor shaft is stopped almost instantly when the motor 164 is de-energized. The motor shaft 167 carries a pinion 168 which meshes with a gear 169 forming part of the speed reducer 59. On the shaft 58 which extends from the speed reducer 59 is mounted a crank 171 carrying a crank pin 172 on which is mounted a pitman 173. The pitman preferably incorporates a sleeve 174 surrounding a spring to afford a cushioned or resilient connection. The pitman 173 terminates in a connection 177 engaging a pin 178 on oscillating levers 179. The lower end of the levers 179 is journaled as at 181 on the frame 31, while the upper end of the levers is pivoted as at 182 to links 183 joined as at 184 to the rear portion of a long stroke ram generally designated 186. The long stroke ram comprises a skeleton frame having side members 187 and runs at its rearward end on rollers 188 tracking in the channels 34 of the framework 31. The forward end of the long stroke ram is supported by pairs of rollers 189 at opposite sides of the machine which engage the side members 187. The side members are joined transversely of the machine by strips 191 which, when the long stroke mechanism is in its retracted position as shown in Figure 1, are substantially in vertical alinement with the strip 73 of the short stroke mechanism and are clear of the path of cans entering transversely of the machine from the runways 37, 38 and 39.

When a carton or case is positioned over the horn or extension 61 of the machine, the rod 161 is translated and closes the switch 162 which releases the magnetic brake 166 and energizes the motor 164. Through the speed reducer 59 the motor simultaneously rotates the cam 57 for raising, by means of the rod 51, the gate 48 to prevent further influx of cans into the machine by forcing backward cans on the runways 37, 38 and 39, and likewise rotates the crank 171 so that through the pitman 173 the oscillating lever 179 is moved toward the right in Figure 1 and the long stroke ram 186 is translated forwardly of the machine, that is, in a direction axially of the cans. The strips 191 contact the adjacent portion of the fourth tier of cans in the machine and advance the four tiers simultaneously through the horn 67 and into the case 68. Since the stroke is sufficiently long that the strips 191 pass just beyond the end of the horn, the loaded case is positively ejected from the machine with a slight velocity. Following such ejection, the long stroke mechanism returns during its cyclic movement from an advanced position to a retracted position as shown in Figure 1. As it approaches its full cycle or retracted position, the cam 57 permits the rod 51 to drop and lowers the gates 37, 38 and 39 so that additional cans run into the machine gravitally for a repetition of the cyclic operation, and at the same time the circuit to the motor 164 is broken and the brake 166 is applied. When the filled case 68 is ejected from the machine, the switch 162 is released under the urgency of its associated spring, and the machine is ready to duplicate the operation just described.

In order to control the sequence of operations of the machine and to provide a means for having one or more cycles of the short stroke mechanism for each cycle of the long stroke mechanism, we preferably provide in the electrical circuit for controlling the solenoid 136 and the motor 164, a pair of commutator discs 201 and 202, respectively, particularly illustrated in Figures 7 to 13. The commutator discs are preferably mounted for simultaneous rotation on the shaft 77 which is mounted in the bracket 78. Preferably, the commutator discs are journaled on the shaft 77 through the medium of a sleeve 203 which not only carries the commutator discs but also carries a ratchet wheel 204 having sixteen teeth around its periphery. On the lever 76 is mounted a pawl 206 which is pivoted as at 207 and is urged into engagement with the ratchet 204 by means of a leaf spring 208, so that for each forward stroke of the short stroke mechanism the ratchet wheel 204 is advanced one tooth. Similarly, the ratchet wheel 204 is engaged by a pawl 209 mounted on a yoke 211 by means of a pivot pin 212, and urged into engagement with the ratchet by a leaf spring 213. The yoke 211 ordinarily rests gravitally against a stop 214 depending from the bracket 78, and is provided with an extension arm 216 projecting into the rotary path of the crank pin 172.

During the initial portion of each cycle of the long stroke mechanism the rotation of the crank pin 172 causes it to engage the extension 216 and to advance the extension 216 about the pivotal mounting of the yoke 211 on the shaft 77. Continued advancement of the crank pin 172 causes the pin to ride under the end of the extension 216 and to release the yoke 211 which then drops gravitally and simultaneously causes the advancement of the ratchet wheel 204 one tooth. It therefore occurs that for each cycle of the short stroke mechanism the ratchet wheel 204 is advanced one tooth, and for each cycle of operation of the long stroke mechanism the ratchet wheel 204 is advanced one tooth. Correspondingly, the commutator discs 201 and 202 are simultaneously advanced with the ratchet wheel 204. Each of the commutator discs is of insulating material and carries four octant segments 221 which are alternated on the periphery of the commutator discs with intermediate octant insulating portions 223. The commutator discs are arranged on the sleeve 203 with identical phase relationship and are adapted to be abutted by brushes 224, 226, 227 and 228 respectively. Current for the circuit, including the commutator discs, is obtained from any suitable source 229, 230, and enters through a master switch 231 to the primary of a transformer 232. The secondary 233 of the transformer has one leg connected by a lead 234 to a wire 236 connected to the switch 156 which is closed upon the final positioning of a can. Leading from the switch 156 is a wire 237 terminating in the brush 224. The brush 226 is connected by a wire 238 and a manually operable switch 239 to a lead 241 joined to the coil 242 of a relay generally designated 243. The other end of the relay coil 242 is connected by a wire 244 to the secondary 233 of the transformer. In parallel with the switch 239 are leads 246 and 247, the first of which connects the brush 227 with the wire 238, and the second of which connects the brush 228 with the lead 241. The relay 243 includes a switch 248 one side of which is connected by a wire 249 to the lead 229, and the other side of which is connected by a wire 251 to the coil 252 of the solenoid 136. The other side of the solenoid coil 252 is joined by a wire 253 to the lead 230.

Also connected to the secondary 233 of the transformer is a wire 254 which terminates in a brush 256 adapted to contact with a drum 257 at the extremity of the shaft 58. The drum includes an interrupted conducting ring 258 and an interposed insulating segment 259. Likewise contacting the drum 257 is a brush 261 joined by a wire 262 to the coil 263 of a relay generally designated 264. The other side of the coil 263 is joined by a lead 266 to the wire 244 and is thus connected to the other side of the secondary 233 of the transformer. The relay 264 includes a switch 267 one side of which is joined by a wire 268 to the lead 249 extending to the power line 229, and the other side of which is joined by a wire 271 to the coil 272 of a starting switch, generally designated 273, for the motor 164 and the brake 166. The coil 272 is joined by a wire 274 and the lead 253 to the power source 230. The switch 273 for the motor 164 controls a circuit having leads 276 and 277 which respectively are joined through a main switch 278 and an additional switch 279 to power lines 281 and 282 respectively. The switch 278 preferably includes a coil 283 and a push button switch 284, in accordance with the usual practice for starting boxes. Also joined to the leads 281 and 282 after the switch 278, are lines 283 and 284 extending to the motor 112.

In Figure 9, the brushes 256 and 261 are paralleled by a pair of leads 286 and 287 respectively. The lead 286 extends from the wire 254 to one side of the switch 162, while the other side of the switch 162 is connected by the lead 287 to the wire 262.

As especially shown in Figures 10 to 13 inclusive, the commutating segments, when the machine is first started, are in the position indicated in Figure 10. When the switch 231 is closed and as soon as a line of cans has rolled into the lowermost shelf 66 and has closed the switch 156, current flows in the lead 237 to the brush 224. Since this brush is at least partially in contact with the conducting segment 221 which is common to commutating discs 201 and 202, current flows through the segment 221 to the adjacent brush 227. Current then flows through the lead 246 to the brush 226 and through the associated conducting segment 221 to the brush 228 and then to the wire 241 and through the coil of the relay 242 to complete the circuit in the secondary 233 of the transformer. The relay 243 being energized, the switch 248 is closed and the solenoid 252 is energized, thereby setting into operation the short stroke mechanism. When the short stroke mechanism has completed the initial portion of its advance, the cans have been removed from the switch 156 which opens and which then de-energizes the circuit of the relay 243 and de-energizes the solenoid 136, so that the short stroke mechanism makes but a single cycle. During this cycle of the short stroke mechanism, however, the ratchet 204 has been advanced one tooth, which advances the commutator discs 201 and 202 into the position illustrated especially in Figure 11. In this position, in the event that the switch 156 is closed by a successive tier of cans contacting the switch arm, the current flows as before into the brush 224 and into the common segment 221 of the discs 201 and 202 and thence through the brush 227 into the lead 246. The brush 226, however, in this position of the disc 201 is in contact with an insulating segment, so that the current can not pass at that point. If, however, a plurality of cycles of the short stroke mechanism are to be made for a single operation of the long stroke mechanism, the switch 239 is placed manually in closed position and the current flows from the wire 238 through the switch 239 into the lead 241 and then completes the circuit through the relay 243 and energizes the solenoid coil 252 to afford an additional operation of the short stroke mechanism. If, however, the switch 239 is manually left in open position, current cannot flow into the lead 241 and the solenoid coil 252 is not energized and the short stroke mechanism does not function.

In the event that the switch 239 is in closed position and the short stroke mechanism makes a second cycle of operation, then the discs 201 and 202 are advanced into the position shown in Figure 12. If, however, the switch 239 is left open and the short stroke mechanism has made but a single cycle, then subsequently, when the switch 162 is closed by the positioning of a case 68 on the horn or extension 67, current is taken from the secondary 233 of the transformer through the lead 254 and the wire 286 and continues through the switch 162 and the wire 287 to the lead 262 which energizes the coil 263 of the relay 264, the return being made through wires 266 and 244 to the secondary 233 of the transformer. The relay 264 being energized, the switch 267 is closed and current from the line 229 follows the lead 268 and the switch 267 and flows through the wire 271 and the coil 272, thence back through the wire 274 and the wire 253 to the source lead 230. The coil 272 then being energized, the switch is closed and the switches 279 and 278 theretofore having been closed for the operation of the machine, the brake 166 is released and the motor 164 is energized to produce a cycle of operation of the long stroke mechanism. During the rotation of the shaft 56 of the speed reducer, the drum 257 is rotated, so that even though the switch 162 may be opened during the cycle of long stroke operation, the conducting ring 258 will maintain the circuit closed through the brushes 256 and 261 until the machine has completed a full long stroke cycle, whereupon the non-conducting segment 259 breaks the circuit between the brushes 256 and 261, and the switch 162 having theretofore been opened permits the coil 263 to become deenergized and to open the switch 267, thereby in turn opening the switch 273 to the motor 164 and the brake 166. During either a short stroke cycle or a full stroke cycle the ratchet 204 is advanced one tooth by the pawl 209, and similarly moves the commutating discs 201 and 202 from the position shown in Figure 11 into the position shown in Figure 12 which is the position when a third tier of cans enters the machine. The switch 156 is again closed and current flows to the brush 224, thence through the segment 221 into the brush 227. The current then follows the conductor 246 and flows through the switch 239 in the event the switch is closed, and thence into the conductor 241, or, alternatively, the current flows from the segment 221 into the brush 228 and thence into the conductor 241: This again causes an energization of the relay coil 242 and energizes the solenoid coil 252 to produce a stroke of the short stroke mechanism. At the conclusion of this third stroke of the short stroke mechanism the parts are in the position indicated in Figure 13. In this position of the parts, current flows upon the closure of the switch 156 by the fourth tier of cans into the brush 224 which is adjacent a non-conducting sector 223, and thus the short stroke mechanism cannot operate. Upon closure of the switch 162, however, by the positioning of a case on the horn or extension 67, the motor 164 produces a cycle of the long stroke ejecting mechanism, during which stroke the ratchet 204 is advanced one tooth and the commutator discs 201 and 202 are returned from the position shown in Figure 13 to their original position as indicated in Figure 10. It thus occurs, by the use of the commutator discs as described, that the cycle of the machine can be arranged so that the short stroke mechanism operates through one cycle and the long stroke mechanism follows immediately thereafter with one cycle of operation. Such functioning of the machine produces two tiers of cans which are ejected into a case. Alternatively, if the switch 239 is placed in closed position, then the machine is effective to produce three complete cycles in succession of the short stroke mechanism which are followed by one complete cycle of the long stroke mechanism, so that four tiers of cans are formed and are simultaneously ejected into a receiving case 68.

In Figures 14 to 22 inclusive there is disclosed a modified form of the can casing machine of our invention, in which but a single ram is used for both the short stroke cycle and the long stroke cycle. In this machine there is provided a framework 301 fabricated of suitable structural shapes and angles, which supports a tier-forming frame 302 incorporating a plurality of superposed shelves 303, 304 and 306. Each of these shelves is arranged horizontally and transversely of the machine and is disposed at the bottom of a can feeding line, generally designated 307, which in the present instance incorporates a plurality of superposed runways 308, 309 and 311. The runways are inclined, and successive cans roll gravitally down the runways until their progress is interrupted by a gate mechanism generally designated 312. The gate mechanism includes a plurality of ockers 313, each of which is identical to the other. Each rocker is pivoted intermediate its ends as at 314 and includes a cross rod 316 adapted in one position to extend into the path of cans rolling down the runway 307 and to prevent further advance of such cans. In the opposite extreme position of the rockers 313, the rods 316 are disposed out of the path of the cans and permit the cans to pass thereover. Each rocker is likewise provided with a transverse stop bar 317 adjacent its opposite end, which, when the opposite end is depressed, is raised sufficiently to block further progress of the cans, but when the rocker is raised to its opposite extreme position is lowered to permit the cans to pass thereover. Preferably, the distance between the member 317 and the rod 316 is equivalent in length to the diameter of a plurality of successively arranged cans, in the present instance, three. The rockers 313 are all oscillated about their pivot points 314 simultaneously, and alternately block cans in the runways 308, 309 and 311 and load the cans in successions of three on the superposed portions of the runways between the rod 316 and the bars 317. When the bars 317 are lowered, the succession of three cans in each layer rolls onto the respective shelf 304, 305 or 306 and is positioned thereon in a relationship suitable for axial advancement.

In order to effect such advancement we provide a switch arm 321 which actuates a switch in a housing 322, closing the circuit to an electric motor 323. The motor shaft 324 carries a pinion in mesh with a gear 327 on the shaft 328 of a speed reducer 329. Projecting from the speed reducer is a transverse shaft 331 which at one end carries a cam 332 of generally circular contour but having a depressed portion 333 which is substantially in uppermost position in the full cycle position of the mechanism. Adapted to ride on the cam 332 is a follower 334 journaled on an arm 336 pivoted as at 337 to the frame 301 of the machine. Connected to the arm 336 by a ball connection is a rod 338 which at its other end is connected by a ball connection 339 to a cross bar 341. The cross bar 341 carries two depending studs 342 surrounded by coil springs 343 interposed between nuts 344 at the end of the studs 342 and between lips 346 projecting from a yoke 347 at its opposite end connected to similar actuating straps 348 pivoted as at 349 to each of the rockers 313. The described mechanism is effective upon the initial operation of the electric motor 323 to rotate the cam 332 and to lift the roller 334 and oscillate the arm 336. Such oscillation lifts the bar 341 and similarly lifts the yoke 347 through the medium of the springs 343 and lifts the strap 348 to oscillate the rockers 313 in order to lower the rods 316 and permit the cans to run gravitally down the runway to the cross bars 317. Since the lowermost ends of the rockers 313 are raised, any progression of cans from the runways 308, 309 and 311 onto the shelves 303, 304 and 306, is effectively prevented. In the event of any jamming of the rockers 313 from any cause whatsoever, the springs 343 yield and preclude any damage to the mechanism.

As the electric motor 323 is placed in operation, not only does the cam 332 operate, but likewise a crank 351 mounted on the extremity of the shaft 331 rotates in a clockwise direction, as seen in Figure 14. The crank 351 carries a crank pin 352 to which a pitman 353 is journaled. The pitman 353 is preferably divided into two separable portions 354 and 356 which are divided in an irregular fashion, as shown at 357 in Figure 15. The portions 354 and 356 are both contained in a frame structure 358 in which a plunger 359 is reciprocable. The lower end of the plunger is tapered as at 361 and is adapted to be seated in a notch 362 in the member 354. The plunger 359 is likewise provided with a circumferential groove 363 in which oppositely urged balls 364 and 366 are situated. Coil springs 367 and 368 held by caps 369 and 371 in the casing 358 urge the balls into the groove 363. In the event of jamming of the mechanism due to a force which tends to draw the parts 356 and 354 apart, the plunger 359 is displaced axially upward due to the cam action of the point 361 in the groove 362 and despite the resistance of the balls 364 and 366, so that in the event of jamming no damage can be done to the contents of the machine or to the machine itself. Furthermore, we prefer that the upward movement of the plunger 359 be effective to open the electrical circuit to the motor 323, and for this purpose we install on the casing 358 a switch housing 372 enclosing a contact 373 mounted on one arm 374 of a bell crank pivoted as at 376. The other arm 377 of the bell crank extends into a transverse slot 378 of the upper portion of the plunger 359. Co-operating with the contact 373 is a contact 379 which is mounted on an arm 381 pivoted as at 382 and normally urged against a stop 383 and in abutment with the contact 373 by a coil spring 384. Current is conducted to the contacts 373 and 379 respectively by flexible leads 386 and 387 respectively. When the plunger 359 rises, due to separation of the parts 354 and 356, the bell crank arms 377 and 374 are oscillated about the pivot point 376 and the contact 373 is moved away from the contact 379. The circuit of the electric motor 323 is then interrupted and can be closed again only by manual return of the parts to the positions shown in Figures 15 and 16.

The portion 356 of the pitman is connected by a journal 388 to a shaft 389 mounted on rocker arms 391. The lower ends of the rocker arms are pivoted as at 392, and the upper ends of the rocker arms are pivoted as at 393 to a link 394 in turn pivoted as at 396 to the framework 397 of a ram generally designated 398. The ram includes side members 399 which, adjacent their forward ends, are carried in rollers 401 mounted on the framework 301, and the ram at its rearward end carries rollers 402 operating in channels 403 forming part of the framework 301. The forward portion of the ram includes transverse strips 404 which are arranged sufficiently above the shelves 303, 304 and 306 as to engage cans mounted thereon and to advance the cans in an axial direction toward the horn 406 or extension of the machine which is adapted to receive the case 407. Preferably, a roller 408 serves as a convenient support for a case being positioned on the machine, and the rollers are preferably mounted on an extension 409 of the framework 301. Usually, the case 407 for use in conjunction with this machine incorporates at least one flap 411 which, as the case is being positioned over the horn 406, is guided by a plate 412 into a channel 413 between the bifurcations of a hook 414.

Projecting into the path of the flap 411 and across the channel 413 is a bent arm 416 which is mounted on the casing of a switch 417 and which controls the energization of the electric motor 323. When the motor is energized, therefore, not only is the gate mechanism operated but the pitman 353 is likewise reciprocated. In addition to this operation, there is operated by means of a gear 418 on the shaft 331 an idler gear 419 which meshes with a gear 421 twice the diameter of the gear 418. The gear 421 is mounted on a shaft 422 which likewise carries a cam 423. Engaging the cam is a roller 424 at the extremity of a link 426, at one end mounted by means of a journal 427 on a cross pin 428 in levers 429. Each lever 429 at its lower end is pivotally mounted as at 431 on the frame 301 and at its other end carries the pivot 392 for the arm 391. Also supporting the link 426 is a lever 431 pivoted as at 432 to the link and at its opposite end pivotally mounted as at 433 on the frame 301. A coil spring 434 is connected by a junction 436 to the shaft 428 and is likewise connected to the framework 301 of the machine. The spring 434 is of sufficient strength to maintain the roller 424 in contact with the cam 423. Due to the arrangement of the parts and to the fact that the shaft 422 makes one revolution for each two revolutions of the shaft 331, the pivotal points 389 and 392 of the lever 391 during one rotation of the shaft 331 advance together and cause a full length or long stroke of the ram 397, whereas for the successive rotation of the shaft 331 the pivots 389 and 392 move in opposite directions and cause a short stroke of the ram 397. By virtue of this construction, therefore, we have provided a means so that one rotation of the shaft 331 causes a short stroke of the ram 397, depositing two tiers of cans in the horn, whereas the next successive rotation of the shaft 331 causes a relatively long stroke of the ram 397, carrying with it two more tiers of cans, depositing all four tiers in the case and leaving the horn bereft of cans.

This arrangement of the mechanism provides for four tiers of cans to be formed on the shelves 303, 304 and 306 prior to the long stroke which ejects them into the case 407. If it is desired to have a double tier of cans formed and subsequently ejected, there is provided a hook 437 which is pivoted at 438 to the frame 301 and which is engageable with a stud 439 on the lever 391 and which acts as a fulcrum for the lever. The pin 439 is so close to the pivot point 392 as not to introduce any sensible error into the long stroke actuation of the ram 397.

In order to ensure that after closure of the switch 322 the machine completes a cycle of operation, we preferably mount on the shaft 422 a drum 441 having a conducting ring 442 and an insulating segment 443. Adapted to co-operate with the drum are brushes 444, 446 and 447 which are held in place in brackets 448 by springs 449. As indicated in the wiring diagram of Figure 19, the circuit includes a source of power from which lines 451 and 452 extend. Interposed in the lines is a master switch 453 leading to conductors 454 and 456. The leads 454 and 456 extend into a magnetically operated switch, generally designated 457, which includes a switching member 458 connected by wires 459 and 461 to the motor 323 and its associated brake 325. The operating mechanism of the magnetic switch 457 includes a coil 462 connected into the secondary 463 of a transformer by leads 464 and 466. The primary 467 of the transformer is joined by wires 468 and 469 to the wires 454 and 456 respectively. The wire 466 is joined by a lead 471 to the brush 444, and is connected by a wire 472 to the can-operated switch 322. From this switch a lead 473 extends to a manually controlled switch 474 for effecting two different modes of operation of the machine, while the other side of the switch 474 is connected to the brush 447 by a lead 476. A wire 478 passes to the carton-actuated switch 417 which is likewise connected by a wire 479 to a lead 481 joined to the brush 446 and extending to the switch contact 379. The other contact 373 is connected by a wire 482 to the secondary 463 of the transformer.

When the machine is initially started, the twin rows of cans rolling down the runways 308, 309 and 311 are effective to close the switch 322 through the medium of the arm 321, and when a carton is positioned over the horn or projection 406 the flap 412 of the carton contacts the arm 416 and closes the switch 417. A circuit from the secondary 463 of the transformer is then traced through the conductor 464, the member 462, the wire 466, the lead 472, the switch 322, the lead 478, the switch 417, the lead 479, the wire 481, the switch 379, and the lead 482, back to the secondary 463. This circuit being energized, the magnetically operated switch 458 is closed and the brake 325 is released while the motor 323 is energized. Ensuing, there is a full long stroke operation of the machine, inasmuch as the hook 437 is in engagement with the pin 439. Since the switch 322 is opened prior to completion of the cycle of operation of the machine, the current in the lead 466 can flow through the wire 471 to the brush 444 and through the conducting segment 442 to the brush 446 and thence back to the secondary of the transformer. At the conclusion of the full cycle of operation, however, the insulating segment 443 comes into position beneath the brush 446 as well as the brush 447, and at the conclusion of the cycle the circuit is interrupted and the switch 458 is opened. The parts are then in their original position and the cycle can be repeated indefinitely.

In the event it is desired to eject four tiers of cans into a carton or case, the hook 437 is removed from the pin 439 and the switch 474 is moved into closed position. Under these conditions, when the machine is started the double row of cans descending the runways 307 comes into position and actuates the switch 322 by means of the member 321. Current then flows from the secondary 463 of the transformer from the lead 464, through the coil 462 to the lead 466, then through the wire 472 and through the switch 322 to the conductor 473. The flow is then through the switch 474 and the lead 476 to the brush 447. Since the conducting sector 442 is in contact with the brushes 447 and 446, current flows to the brush 446 and thence through the wire 481 and the switch 379 back to the secondary 463 of the transformer. Upon completion of this stroke, which is a short stroke due to the rotation of the shaft 422 and the movement of the link 429 by the pitman 426, the drum 441 has been rotated one half revolution from the position shown in Figure 19, with the insulating segment 443 underlying the brushes 446 and 447 but with the brush 444 in contact with the conducting sector 442.

Upon the return of the ram to its retracted position after the short stroke, two rows of cans again travel down the runways 307 and in coming into position actuate the switch 322. In this event current flows from the secondary 463 of the transformer to the lead 472 as before described, and passes through the switch 322 and the switch 474 to the brush 447. At this juncture, however, the insulating sector 443 is in contact with the brush 447 and current cannot pass to the brush 446. Neither can current flow from the conductor 466 through the lead 471 and the brush 444 to the sector 442, since the insulating segment 443 is in contact with the brush 446. However, as soon as the carton or case has been positioned on the extension 406, the switch 417 is closed and current flows from the switch 322 through the lead 478 and the switch 417 to the lead 479, thence to the conductor 481 and the switch 379, back to the secondary 463 of the transformer. During the ensuing long stroke of the mechanism the drum 441 is again rotated a half a revolution and returns to the position shown in Figure 19. If the case switch 417 is opened during the cycle of long stroke revolution, but before the completion thereof, current is maintained in the circuit by flow through the conductor 471, the brush 444, the conducting segment 442, and the brush 446, back through the switch 379 to the secondary 463 of the transformer. At full cycle position of the machine, however, the carton switch 417 is opened by dislodgment of the carton from the extension 406, due to the long stroke, so that the flap 412 is removed from the switch 417 which then opens. Upon the insulating segment 443 returning to the position shown in Figure 19, the circuit between the brushes 444 and 446 is interrupted. Previously, and after the cans have been moved axially forward in the beginning of the full stroke cycle, the can switch 322 is opened, since the cans advance out of the way of the switch arm 321. The parts are therefore returned to their original position and are suitably disposed for repetition indefinitely as the described four-tier cycle.

As indicated in Figure 23, under certain conditions we prefer to modify the linkage giving the long stroke cycle and the short stroke cycle, from the form shown particularly in Figure 14 to the form shown in Figure 23. In this instance, the framework 486 of the machine supports a ram or plunger 487 as previously described, which is mounted for reciprocation on the framework 486 and is connected by a link 488 pivoted at opposite ends as at 489 to the ram 487 and at 491 to a lever 492. The lever 492 at its lower end is pivoted as at 493 to a rocker link 494 pivoted at 496 on the frame 486. A cam follower rod 497 is journaled at 498 on the rocker link 494 and at its opposite end carries a roller 499 adapted to contact a cam 501. A link 502 assists in supporting the pitman 497 for substantially a parallel motion. A coil spring 503 is at one end connected to a bracket 504 on the frame 486 and at the other end is connected to the pitman 497 to urge the roller 499 against cam 501. The cam is mounted on a cross shaft 506 which is provided with a gear 507 meshing with an idler gear 508 carried by a stub shaft 509 in the frame and meshing with a drive gear 511 mounted on a speed reducer shaft 512. The gear 511 is one half the diameter of the gear 507 so that, for each revolution of the shaft 512, the shaft 506 makes one half of a revolution. The speed reducer shaft 512 is driven by a shaft 513 carrying a gear 514 which meshes with a pinion on a motor shaft 516. An electric motor 517, provided with a magnetically actuated brake 518, serves as a source of power. The shaft 512 carries a crank arm 519 provided with a crank pin 521 on which one end of a pitman 522 is connected by a journal 523. The other end of the pitman is provided with a journal 524 mounted on a shaft 526 forming part of the lever 492.

When the motor 517 is energized, due to the operation of the pitman 522 and the pitman 497, during one rotation of the shaft 512 the lever 492 is moved into the dashed-line position 527 with the plunger or ram 487 in the position indicated by the line 528, and thus effects a long stroke operation. Upon the next complete revolution of the shaft 512, however, the cam 501 rotates during a successive half revolution and, due to the contour of the cam and its consequent actuation of the pivot 493, the lever 492 moves into the dashed-line position 529, so that the plunger or ram 487 moves into the position indicated by the line 531 and thereby effects a short stroke cycle. With this arrangement, the short stroke cycle and the long stroke cycle alternate in the operation of the machine, but in the event that the pitman 497 is held from following the contour of the cam 501 and is held in the position shown in Figure 23, each rotation of the shaft 512 will, through the pitman 522, produce a complete long stroke cycle of the ram 487.

We claim:

1. A can casing machine comprising a can-holding rack adapted to receive and hold a plurality of cans for ejecting into a case, a pair of optionally operable means for advancing cans in said rack, electrical means for operating said pair of advancing means, and an electric switch operating in time with the operation of the machine for controlling said operating means.

2. A can casing machine comprising means for stacking cans in a plurality of rows arranged one above the other, a first means for shifting said cans a short distance in the direction of their axes, a second means for shifting said cans a long distance in the direction of their axes, and means for selecting and controlling the sequence of operation of said first means and said second means during the operation of the machine.

3. A can casing machine comprising means for stacking cans in a plurality of rows arranged one above the other, a first means and a second means for shifting said cans in the direction of their axes, a main operating mechanism, and connections from said operating mechanism for giving complete operations to said first means and to said second means selectively at different periods of a single operation of said mechanism.

4. A can casing machine comprising a can-holding rack adapted to hold a plurality of superposed rows of cans, a short-stroke mechanism for advancing said rows of cans in said rack, a long-stroke mechanism for expelling said rows of cans from said machine, and means for varying the number of operations of said short-stroke mechanism for each operation of said long-stroke mechanism.

5. A can casing machine comprising a can-holding rack adapted to hold a plurality of superposed rows of cans, a short-stroke mechanism adapted to reciprocate between a retracted position and an advanced position, a long-stroke mechanism adapted to reciprocate between a retracted position and an advanced position, runways for supplying said rack with cans, means for withholding cans on said runways, and means for operating said withholding means to release cans from said runways to said rack only when said short-stroke mechanism and said long-stroke mechanism are in retracted position.

6. A can casing machine comprising a can-holding rack adapted to hold a plurality of superposed rows of cans, a short-stroke mechanism for advancing said rows of cans in said rack, a long-stroke mechanism for expelling said rows of cans from said machine, a first means for operating said short-stroke mechanism, a second means for operating said long-stroke mechanism, a step-by-step mechanism for controlling said first means and said second means, and means for advancing said step-by-step mechanism one step for each operation of said short-stroke mechanism and one step for each operation of said long-stroke mechanism.

7. A can casing machine comprising a can-holding rack adapted to hold a plurality of superposed rows of cans, a short-stroke mechanism for advancing said rows of cans in said rack, a long-stroke mechanism for expelling said rows of cans from said machine, a first means for operating said short-stroke mechanism, a second means for operating said long-stroke mechanism, a step-by-step mechanism for controlling said first means and said second means as to sequence of operation, means for changing the sequence of operation under control of said step-by-step mechanism, and means for advancing said step-by-step mechanism one step for each operation of said short-stroke mechanism and one step for each operation of said long-stroke mechanism.

8. A can casing machine comprising a can-holding rack adapted to hold a plurality of superposed rows of cans, a short-stroke mechanism for advancing said rows of cans in said rack, a long-stroke mechanism for expelling said rows of cans from said machine, a first electric means for operating said short-stroke mechanism, a second electric means for operating said long-stroke mechanism, an electrical switching mechanism adapted to advance step-by-step for controlling said first electric means and said second electric means, and means responsive to the operation of said short-stroke mechanism and to the operation of said long-stroke mechanism for advancing said switching mechanism.

LESLIE W. HILLS.
HAROLD W. CLARK.